United States Patent [19]
Ott

[11] Patent Number: 4,770,560
[45] Date of Patent: Sep. 13, 1988

[54] SELF-TAPPING CONNECTOR

[76] Inventor: Donald E. Ott, 17754 W. Spring Lake Rd., Spring Lake, Mich. 49456

[21] Appl. No.: 55,341

[22] Filed: May 29, 1987

[51] Int. Cl.$^4$ ............................................. F16B 7/00
[52] U.S. Cl. .................................. 403/296; 403/348; 403/350; 411/418
[58] Field of Search ............... 403/292, 295, 296, 297, 403/298, 348, 350; 411/418

[56] References Cited

U.S. PATENT DOCUMENTS

| | | | |
|---|---|---|---|
| 3,532,369 | 10/1970 | Reilly | 403/178 X |
| 3,645,569 | 2/1972 | Reilly | 403/295 X |
| 4,111,577 | 9/1978 | Kiyosawa | 403/298 X |

FOREIGN PATENT DOCUMENTS

| | | | |
|---|---|---|---|
| 2331410 | 1/1975 | Fed. Rep. of Germany | 403/350 |
| 1290562 | 9/1972 | United Kingdom | 411/418 |

Primary Examiner—Andrew V. Kundrat

[57] ABSTRACT

A connector for cross-sectionally square, rectangular, hexagonal or other shaped tubes, including a solid cube-shaped block body having tapered arm members extending outwardly from its square sides; each arm having a spiral pipe screw thread therearound intercepted by elongated flutes so that the arm is cross-sectionally Greek cross-shaped with outwardly rib portions between the flutes, so as to be slidably fitted into a square or rectangular tube end or into the end of a hexagonal or other shaped tube with a square insert with the ribs being received in the corners of the square or rectangular tube or of the square insert whereby subsequent rotation of the tube causes the screw thread on the outer side of the ribs to cut an engaging thread on an inner side of the tube, or on the inner side of the square insert.

3 Claims, 2 Drawing Sheets

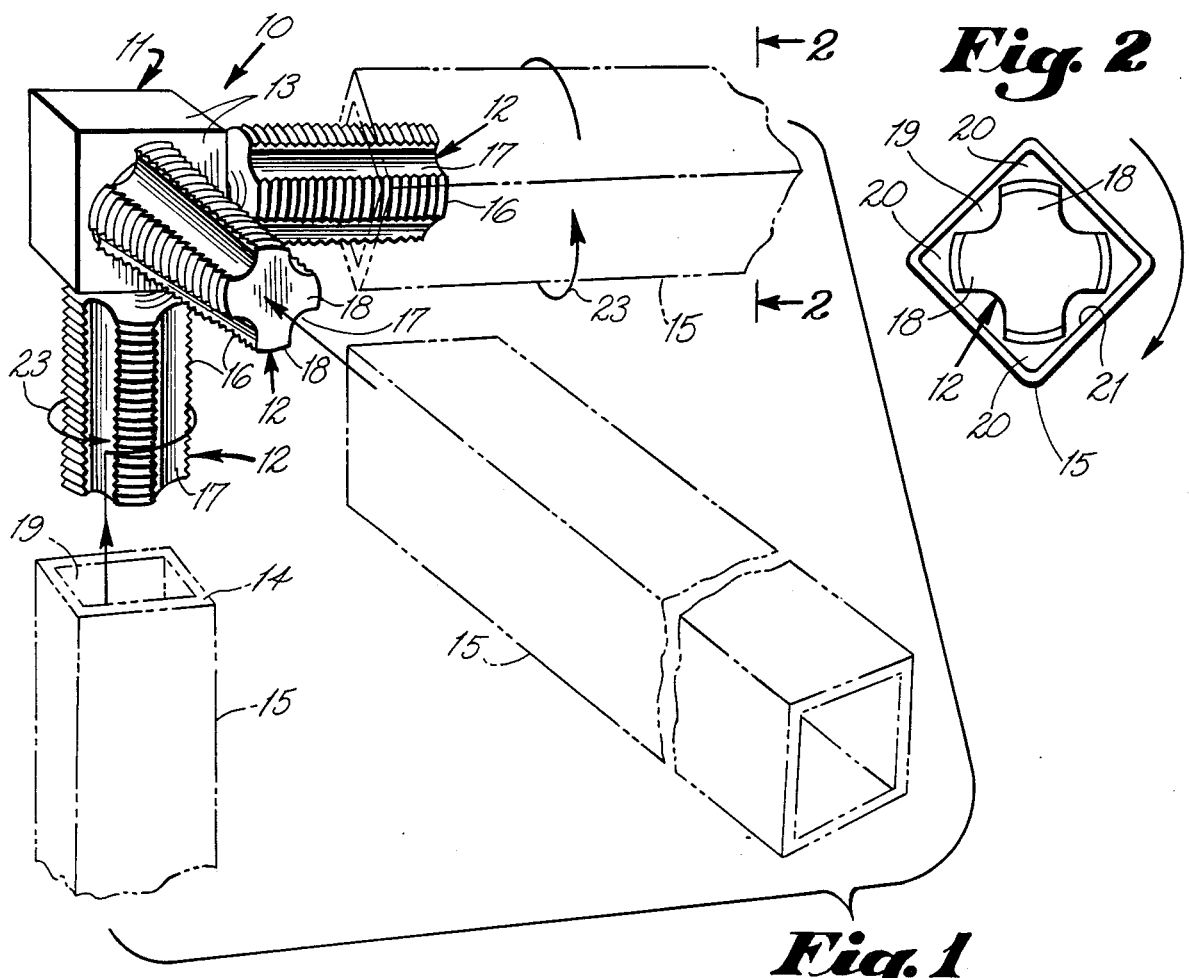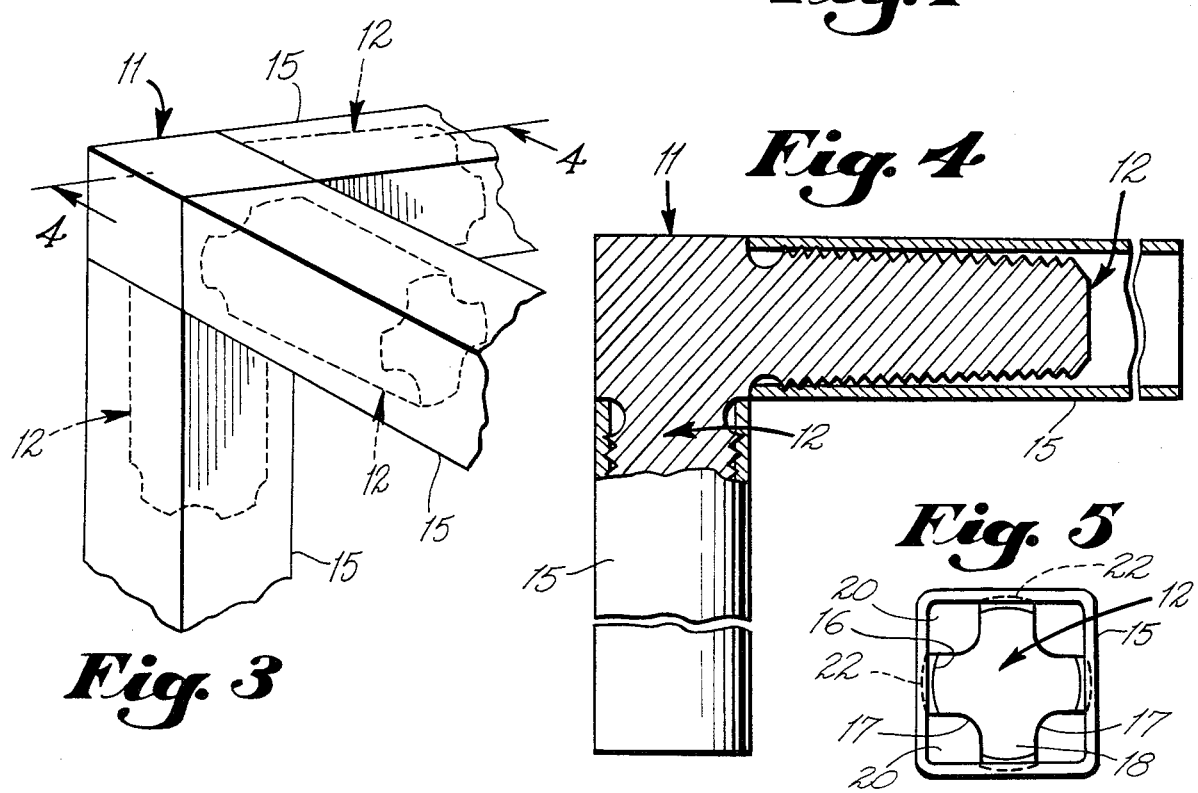

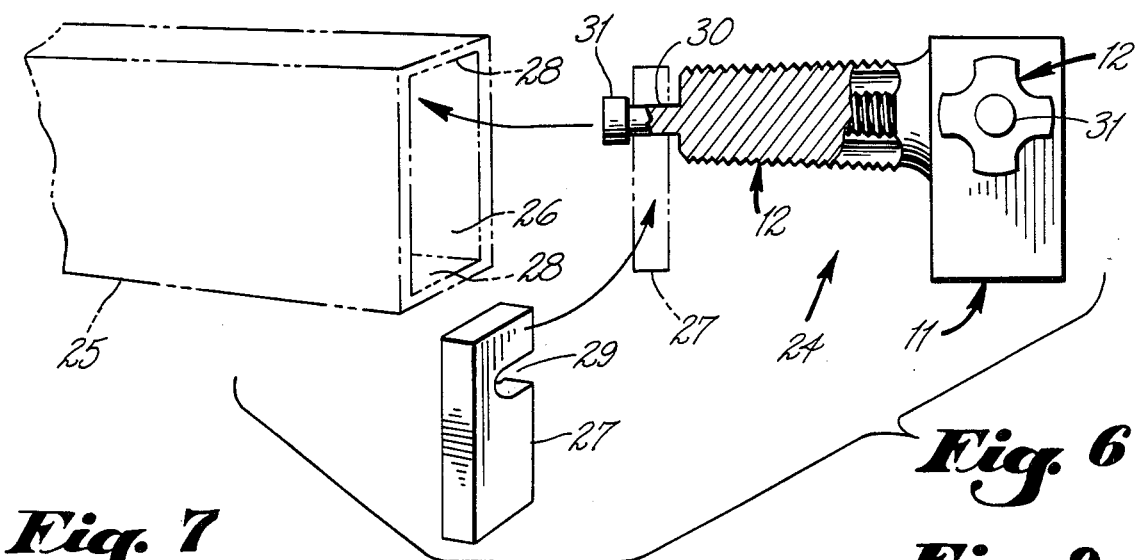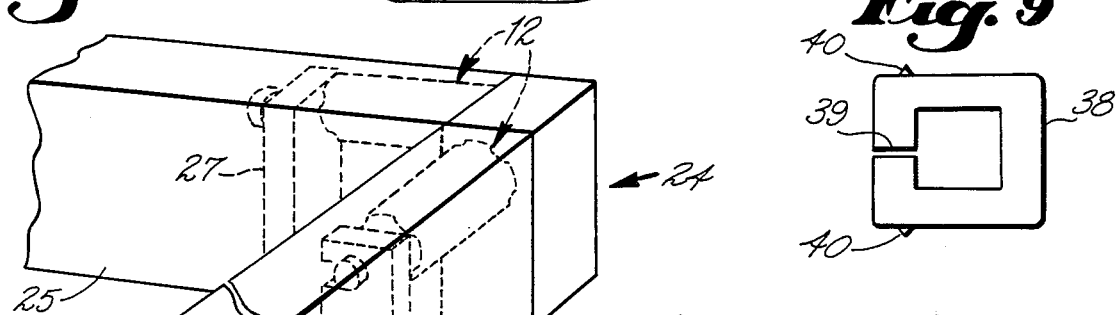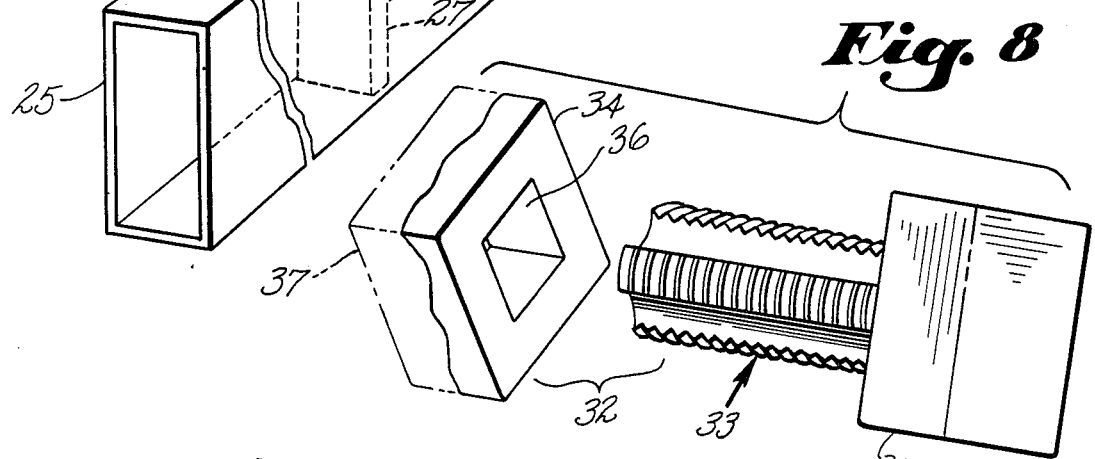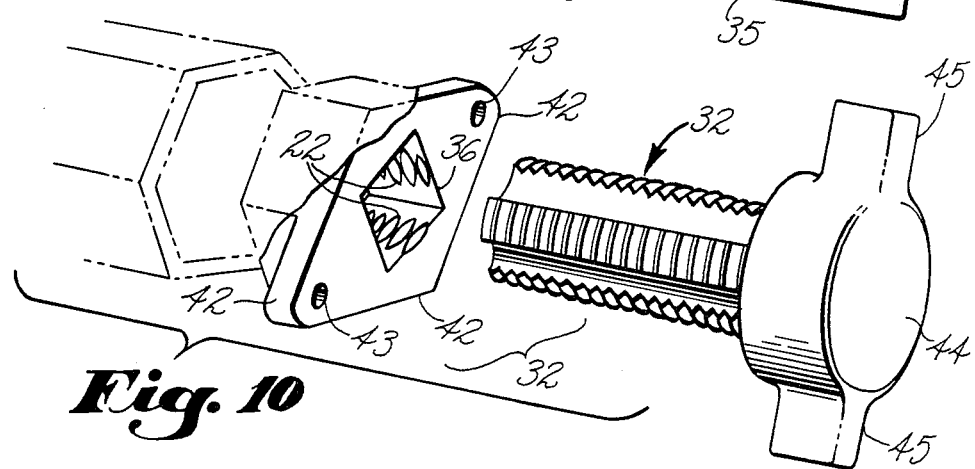

SELF-TAPPING CONNECTOR

BACKGROUND OF THE INVENTION

1. Field of the Invention

This invention relates generally to display racks, shelving, furniture and like structures which are formed by connecting elongated tubes of square or rectangular cross-sections. More particularly, it relates to connectors for connecting together the ends of such square, rectangular, hexagonal, or any other shaped tubes used in these structures. It also relates to a quick-acting connector for holding together parts.

2. Prior Art

It is well known that numerous connectors have been developed in the past for joining together the ends of tubings, as is evident by U.S. Pat. Nos. 3,532,369 to REILLY, 3,645,569 to REILLY, 3,666,298 to REILLY, 4,161,375 to MURPHY, as well as other U.S. and foreign patents.

While all of these accomplish their intended joining task, they generally are not ideal in all respects. Some rely on friction fitting wherein one member is pounded into a tube so are subject to becoming loosened under vibration conditions, or are difficult to disassemble. Others are time consuming to assemble or expensive to manufacture. Still others require clips or separate resilient members for establishing connections between associated tubes. Thus, there still remains a need for an improved tubing connector that overcomes the above indicated shortcomings.

SUMMARY OF THE INVENTION

Accordingly it is a principal object of the present invention to provide an effective connector for establishing a secure relationship with the end of a square or rectangular tube, or with the ends of two or more such tubes.

Another object is to provide a self-tapping connector which provides a more secure fit between the tubes and the connector.

Still another object is to provide a self-tapping connector that creates its own interconnection means, is quick and easy to install and avoids handling of separate clips or screws, nor needs friction fits that require being pounded together, so that this new connector simplifies the assembly of tubular structures.

Yet another object is to provide a self-tapping connector which itself is of superior strength, and produces a stronger and tighter interconnection between parts than former connectors. This connector is also easier and less expensive to manufacture than former connectors.

The connector of the present invention is adaptable for joining the ends of tubes either at a corner of a tubular structure or at intermediate locations thereof, and may be made to accomodate varied numbers of such tubes. Instead of handling separate extra interconnectable accessories, it creates its own interattachable screw thread at the time of making a connection thereof with a tube. The attachment is quickly accomplished, requiring only approximately a 45 degree rotation of a tube after being slided thereupon, and may be equally easy and quick for subsequent disassembly and reassembly.

BRIEF DESCRIPTION OF THE DRAWING FIGURES

FIG. 1 is a perspective view of one embodiment of the invention shown with a plurality of square tubes being attached thereto.

FIG. 2 is a view in direction 2—2 of FIG. 1 showing the tube inserted on the connector and prior to being rotated into secured position.

FIG. 3 is a perspective view of the invention shown after the tubes are attached thereto so as to form a typical corner of a structural assembly.

FIG. 4 is a cross-sectional view on line 4—4 of FIG. 3.

FIG. 5 is a view similar to FIG. 2 showing the tube after having been rotated into secured position on the connector.

FIG. 6 is a side-elevational view, shown partly in cross section, of another embodiment for connection to rectangular tubes.

FIG 7 is a perspective view of a construction corner assembly using rectangular tubes as indicated in FIG. 6.

FIG. 8 is a perspective view of another embodiment of the invention for a quick-acting connector.

FIG. 9 is a side of another embodiment of an insert shown in FIG. 8.

FIG. 10 is a perspective view of another embodiment of the quick-acting connector shown in FIG. 8.

DETAILED DESCRIPTION OF PREFERRED EMBODIMENTS

Referring now to the drawings in greater detail, and more particularly to FIGS. 1 to 5 thereof at this time, the reference numeral 10 represents a self-tapping connector according to the present invention wherein there is a six-sided base block 11 that is made rigidly integral with a plurality of elongated connection arms or shanks 12 each one of which projects outwardly from one flat face or side 13 of the block. The block is shown to be cubic in shape and each square-shaped side thereof is adaptable to abut against a flat end face 14 of a conventional, cross-sectionally square tube 15 made of metal or thermoplastic such as are commercially available for constructing framework. The six-sided block permits three-dimensional construction and may be a same in dimension as the cross-section of the tubes so that faces of the block and sides of the tubes align flush together when assembled, as shown in FIG. 3. While the drawing shows three connection arms projecting from the block, the invention is not limited thereto, and may include any number up to six.

Each shank is basically cylindrical in shape, being slightly tapered toward its outer end, and includes a spiral pipe screw thread 16 around its side, but which is intercepted by four, deep equally spaced apart, longitudinal flutes or grooves 17 so that the arm, instead being truly cylindrical, is actually transversely Greek cross-configurated with four outwardly protruding ribs 18 between the grooves. This shape permits insertion of a larger diameter arm into a smaller width square opening 19 of the tube by placement of the ribs in the square corners 20 of the opening, as shown in FIG. 2. Then by rotating the tube on the arm, the screw thread 16 engages the wall surface 21 of the opening 19 and die cuts a thread 22 therein for screw thread engagement therewith when in the position as shown in FIG. 5.

In operative use, each arm is inserted in an end of a tube and is then rotated as shown by arrow 23 until engaging screw thread 22 is cut and the tube abuts the block.

The self-tapping connector 10 is made of steel, zinc or other hard material.

FIGS. 6 and 7 illustrate another embodiment of self-tapping connector 24 that is designed particularly for use with rectangular tubes 25, and which includes means to prevent an arm to accidentally shift its position inside the tube rectangular opening, such as in case of a heavy load supported on a constructed framework causing the arm to drop down into a lower unoccupied portion 26 of a tube. This is accomplished by means of a thick plate 27 inside the tube which retains the arm for shifting from its originally intended position. The plate fits the greater width of the tube opening so as to abut both opposite end walls 28 thereof. It serves to abut the arm with one end wall 28 for engage ment therewith. The plate has a notch 29 in which the arm is supported against shifting. The arm is made with an axially extending pin 30 on its end and having an enlarged pin head 31. Before inserting the arm into the tube, the plate is hooked around the pin. The pin head prevents the plate becoming disengaged from the arm pin. In another modified design of this embodiment (not shown in the drawings) the connector 24 is made with the plate already installed on the pin when the device is retailed, thereby eliminating the extra time for assemblying efforts thereof by a user. A circular hole would substitute the notch 29, and a simple headed screw could substitute a pin formed on the arm.

Referring now to FIG. 8, another embodiment of the invention comprises a self-tapping connector 32 which is being termed as a "quick connector" due to its simple yet strong connection in actual use when expediency is important. It comprises a boltlike assembly of an arm or shank member 33 engageable with an insert member 34 that is adaptable to be press fitted into an end of a tube. The shank member comprises the threaded shank or arm 12, described above, and the block formed on its one end comprising an enlarged head 35. This form of the invention may be also used independently as a bolt set for rigidly holding parts together between the head and the insert which thus serves as a conventional nut, if so preferred. As shown, the head may be made a same shape and also a same or larger size than the insert, as wished. The insert includes a square central opening 36 therethrough that would be tap threaded by insertion of the shank. The connector 32 can also serve as an end cap for simply closing a tube end that does not connect to other structure, such as, for example, a lower end of a leg. As suggested by the phantom lines 37, the insert may be made longer.

As suggested in FIG. 9, the insert 38 may be made with a split 39 so as to be expandable within a tube opening, and projecting teeth 40 providing frictional bite against the tube opening wall. Thus as the shank threads into the insert, the insert also expands for grasping the tube.

In FIG. 10, the quick-acting connector 32 has an insert that includes other features such as wings 42 having mounting openings 43 or the like. The head 44 on the shank includes side wings 45 for easy manual rotation.

As suggested in FIGS. 8 and 10, the inserts may be made adaptable for square, hexagonal or any other shaped tubes. The connectors 32 like the connectors 10, are made of hard materials suitable to cut and retain screw threads.

While various changes may be made in the detail construction, it is understood that such changes will be within the spirit and scope of the present invention, as is defined by the appended claims.

What I claim as new, is:

1. A self-tapping connector for assembling tubular members together, end to end, comprising, in combination, a solid block-shaped body having a plurality of faces, a plurality of solid arms integral with said body, each said arm projecting outwardly from a different said face, each said arm being outwardly convergingly, slightly tapered constantly uniform throughout its length; a spiraled screw thread around said arm being intercepted by longitudinal, equally spaced apart flutes so to form four raised ridges therebetween and the arm being transversely Greek cross configurated; a transversely polygonal shaped opening for said arm being carried on said end of said tubular member, diametrically opposite side ridges of said arm being a lesser dimension transversely thereacross than a distance between diagonally opposite corner areas of said opening so that said arm is slidably receivable thereinto but being greater than distance between opposite flat side walls of said opening so to thread tap therein when rotated.

2. The combination as set forth in claim 1, wherein an insert is fitted inside said tubular member, and said polygonal opening is in said insert, said polygonal opening being square shaped and having a radial split so to be expandable within said tubular member, and projecting teeth on an outer side of said insert for frictional bite against said tubular member.

3. The combination as set forth in claim 1, wherein said polygonal opening and a plate fitted therewithin are rectangular shaped, said arm including an axially extending pin on its end received in a slot of said plate for retaining said arm in position so to thread tap at least one end wall of said rectangular opening together with both opposite side walls thereof.

* * * * *